US007343679B2

(12) United States Patent
Komuro

(10) Patent No.: US 7,343,679 B2
(45) Date of Patent: Mar. 18, 2008

(54) METHOD FOR MANUFACTURING A LIQUID EJECTION ELEMENT SUBSTRATE

(75) Inventor: Hirokazu Komuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 11/179,622

(22) Filed: Jul. 13, 2005

(65) Prior Publication Data

US 2006/0012639 A1 Jan. 19, 2006

(30) Foreign Application Priority Data

Jul. 16, 2004 (JP) ............................ 2004-210087

(51) Int. Cl.
*B21D 53/76* (2006.01)
*G01D 15/00* (2006.01)

(52) U.S. Cl. ......................... 29/890.1; 29/831; 29/832; 29/842; 29/846; 216/27

(58) Field of Classification Search ............... 29/890.1, 29/830, 831, 832, 835, 842, 846; 216/27, 216/46; 347/47, 59, 45, 55, 63, 67, 61
See application file for complete search history.

(56) References Cited

U.S. PATENT DOCUMENTS 4,847,630 A * 7/1989 Bhaskar et al. ............... 347/63
4,889,587 A 12/1989 Komuro ..................... 156/643
4,936,952 A 6/1990 Komuro ..................... 156/643
4,968,992 A 11/1990 Komuro ..................... 346/1.1
5,140,345 A 8/1992 Komuro ..................... 346/140
5,148,204 A * 9/1992 Rezanka ...................... 347/55
5,211,754 A 5/1993 Komuro ..................... 118/300
5,631,680 A * 5/1997 Sugahara ..................... 347/69
5,922,515 A * 7/1999 Chiang et al. .............. 430/312
2006/0012640 A1 1/2006 Komuro ...................... 347/61
2006/0012641 A1 1/2006 Komuro ...................... 347/61

FOREIGN PATENT DOCUMENTS

JP 5-41405 A 2/1993
JP 2000-52549 2/2000
JP 2002-67328 3/2002

* cited by examiner

*Primary Examiner*—Peter Vo
*Assistant Examiner*—Tai van Nguyen
(74) *Attorney, Agent, or Firm*—Fitzpatrick, Cella, Harper & Scinto

(57) ABSTRACT

A manufacturing method for manufacturing a liquid ejection element substrate for a liquid ejection element for ejecting liquid through an ejection outlet, the liquid ejection element substrate including an energy generating element for generating energy for ejecting the liquid and an electrode for supplying electric power to the energy generating element, includes a step of forming on a front side of the substrate an energy generating element and wiring electrically connecting with the energy generating element; a step of forming a recess in the form of a groove on the side of the substrate at a position where the wiring is formed; a step of forming an embedded electrode electrically connected with the wiring by filling electrode material in the recess; and a step of thinning the substrate at a back side after formation of the embedded electrode to expose the embedded electrode at the back side of the substrate, thus providing an electrode exposed at the back side of the substrate.

9 Claims, 15 Drawing Sheets

METHOD FOR MANUFACTURING A LIQUID EJECTION ELEMENT SUBSTRATE

FIELD OF THE INVENTION AND RELATED ART

The present invention relates to a liquid ejection element preferred for recording on recording medium by ejecting ink from ejection orifices, and a method for manufacturing such a liquid ejection element.

In recent years, an ink jet recording apparatus has been increased in recording density and recording speed. With the increase, an ink jet recording head also has been increased in the density at which its ejection orifices are arranged, and the number of nozzles. The size of a liquid ejection element is dependent upon the number of ejection orifices, that is, energy generating members. Therefore, increasing a liquid ejection element in the number of ejection nozzles increases a liquid ejection element in size. On the other hand, in order to record in full-color, an ink jet recording head needs to be provided with multiple liquid ejection elements, the number of which equals the number of various color inks ejected by the liquid ejection elements for full-color recording. Thus, not only is a liquid ejection element required to be long enough in terms of the direction parallel to the direction in which ejection nozzles are aligned, but also, to be as small as possible in the sizes of the structural components other than the structural component which has the ejection nozzles. In addition, from the standpoint of improvement in the efficiency with which the various materials for a liquid ejection element are utilized, that is, in order to minimize the amount of each of the various materials for a liquid ejection element, a liquid ejection element is desired to be as small as possible.

Regarding this subject, Japanese Laid-open Patent Applications 2002-67328 and 2000-52549 disclose a proposal for reducing in size the surface area of a liquid ejection element used for external electrical connection. According to this proposal, the front and rear surfaces of the substrate of a liquid ejection element are connected with the use of through electrodes in order to reduce in size the abovementioned areas. Employment of this structural arrangement makes it possible to use the rear side of a liquid ejection element to connect the electrical components of the liquid ejection element to the electrical components on another substrate, minimizing thereby the effects of the members for electrically connecting the former to the latter, upon the gap between the surface of the liquid ejection element, which has ejection orifices, and recording medium.

In order to make electrical connection between a liquid ejection element having a large number of liquid ejection nozzles arranged at a high density, to the electrical component on another substrate, on the rear side of the liquid ejection element, a large number of through electrodes must also be arranged at a high density. When using through electrodes, through holes are formed in advance through the substrate of a liquid ejection element. Generally, these through holes are made with the use of a laser or dry etching. These methods, however, suffer from the following problems. That is, the longer the through hole to be formed, that is, the thicker the substrate, the less, in positional accuracy, straightness, and perpendicularity, the resultant through hole. Further, the thicker the substrate, the longer the time required to form the through holes, and therefore, the higher the cost for forming the through holes. As for a through electrode, it is formed in a through hole by plating. Thus, the longer the through hole to be filled by plating, that is, the smaller the ratio of the diameter of the through hole relative to the thickness of the substrate, the more difficult it is to fill the through hole by plating. For the above given reasons, it has been difficult to arrange a large number of through electrodes at a high density, as long as a substrate used for manufacturing a liquid ejection element remains the same as it has been.

Unless a large number of through electrodes can be arranged at a high density, it is difficult to take advantage of the merit of using through electrodes, that is, being able to make electrical connection between the electrical components of a liquid ejection element and the electrical components on another substrate, that is, a substrate other than the substrate of the ink ejection element, on the rear side of the liquid ejection element, and therefore, it is difficult to reduce in size a liquid ejection element.

Further, an ink supply canal is also a through hole made in the substrate of a liquid ejection element. Therefore, the above described problems concerning the formation of the through electrodes also concern the ink supply canal, in terms of positional accuracy and processing time. From the standpoint of positional accuracy, the positional relationship between an energy generating element and ink supply canal is of greater concern, because the nonuniformity in the positional relationship between an energy generating member and ink supply canal in a liquid ejection element affects the characteristic of the liquid ejection element in terms of liquid ejection, lowering thereby the level of image quality at which recording is made by the liquid ejection element.

As for the means for solving these problems, it is possible to reduce in thickness the precursor of the substrate of a liquid ejection element, that is, a plate of a predetermined substance, on which energy generating members are formed, and through which the through holes are formed. In reality, this is not feasible for the following reason. That is, when forming energy generating members, through electrodes, etc., the substrate of a liquid ejection element is subjected to a film forming process which is carried out in a vacuum. During this process, the substrate is subjected to high temperatures. Therefore, if the precursor of the substrate of a liquid ejection element is thin, it is likely to warp or break. Further, when forming electrical elements for a signal driving system, for example, that is, the electrical elements other than energy generating members on the substrate, the substrate is put through high temperature processes such as diffusion. Therefore, the temperature of the substrate becomes even higher, which is more likely to cause the substrate to warp and/or break than the aforementioned film forming process in a vacuum. Moreover, a nozzle plate is likely to be formed of resin, and if resin is used as the material for the nozzle plate, the thin substrate of a liquid ejection element is likely to be warped by the residual stress or the like which occurs as the resin hardens. Warping of the substrate results in the reduction in the level of accuracy at which the various structural components of a liquid ejection element are formed through the processes which follow the nozzle formation, and also, makes it difficult to handle the substrate thereafter.

SUMMARY OF THE INVENTION

The primary object of the present invention is to efficiently manufacture a liquid ejection element at a high level of accuracy, in order to yield a liquid ejection element which is substantially smaller in size and cost than a liquid ejection element manufactured by a liquid ejection element manufacturing method in accordance with the prior art.

According to an aspect of the present invention, there is provided a manufacturing method for manufacturing a liquid ejection element substrate for a liquid ejection element for ejecting liquid through an ejection outlet, said liquid ejection element substrate including an energy generating element for generating energy for ejecting the liquid and an electrode for supplying electric power to the energy generating element, said method comprising a step of forming on a front side of said substrate an energy generating element and wiring electrically connecting with said energy generating element; a step of forming a recess in the form of a groove on said side of the substrate at a position where said wiring is formed; a step of forming an embedded electrode electrically connected with said wiring by filling electrode material in said recess; and a step of thinning said substrate at a back side after formation of said embedded electrode to expose said embedded electrode at the back side of said substrate, thus providing an electrode exposed at the back side of said substrate.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention will be described with reference to the appended drawings.

In the following descriptions of the preferred embodiments of the present invention, "liquid ejection element substrate" (which hereinafter may be referred to simply as element substrate) means a piece of plate on which electrical structural components, such as an energy generating member, an electrode, and the like, for ejecting liquid are formed.

Basically, "liquid", droplets of which are the objects to be ejected by a liquid ejection element, means ink, that is, liquid which contains a single or multiple coloring matters. However, it also includes liquid which is used for processing recording medium before or after the deposition of ink onto the recording medium, in order to prevent ink bleeding, for example. Whether the liquid ejected by a liquid ejection element is ink or liquid for processing recording medium does not affect the effects of the present invention.

Figure 1:
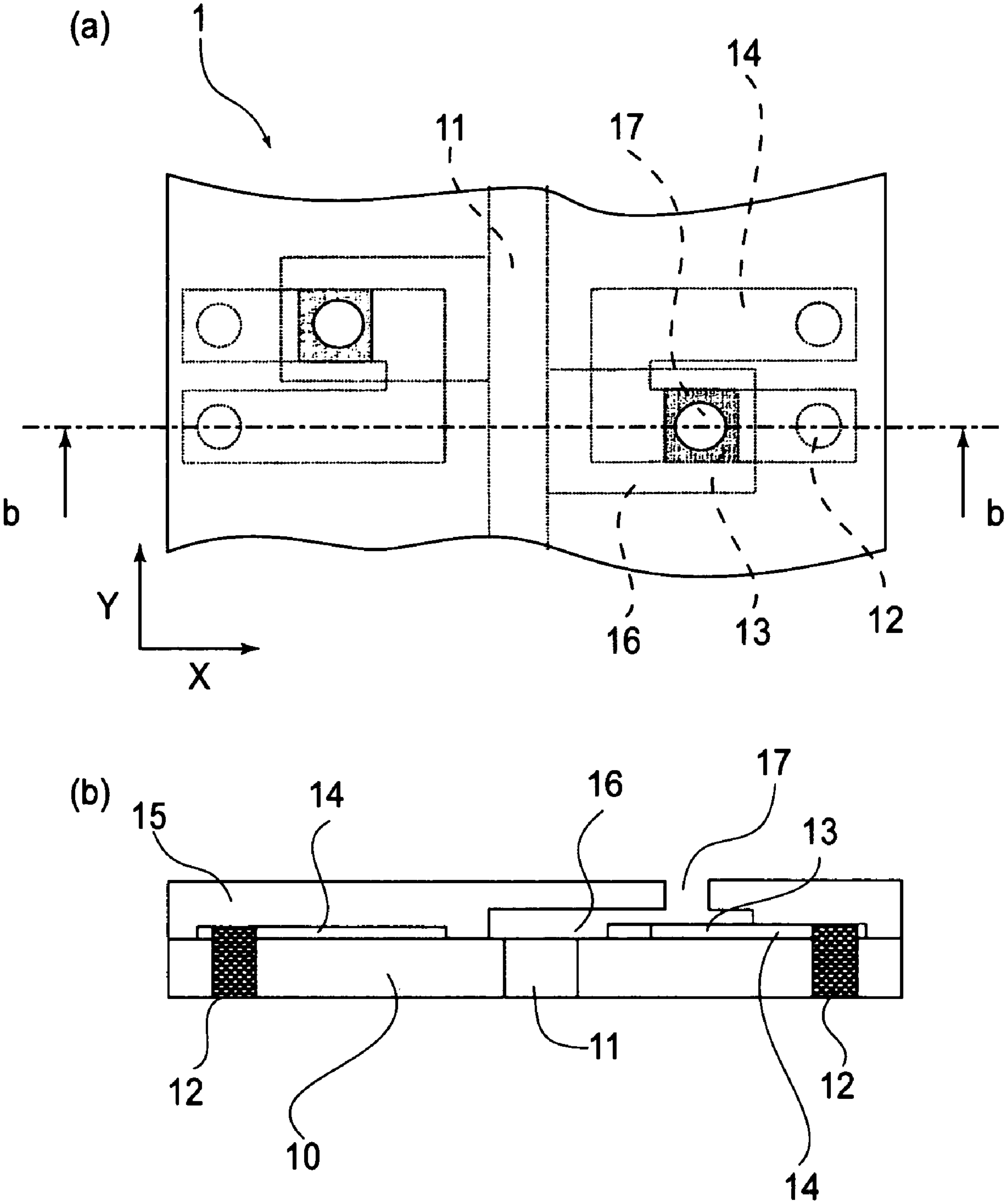
FIG. 1(*a*) is a plan view of one the essential parts of the liquid ejection element in the first embodiment of the present invention, and FIG. 1(*b*) is a sectional view of the portion of the liquid ejection element shown in FIG. 1(*a*), at Line b-b in FIG. 1(*a*).

FIG. 1(*a*) is a plan view of one of the essential parts of the liquid ejection element in this embodiment, and FIG. 1(*b*) is a sectional view of the part of the liquid ejection element shown in FIG. 1(*b*), at Line b-b in FIG. 1(*a*).

The liquid ejection element 1 shown in FIG. 1 is made up of multiple heat generation resistors 13 as energy generating members, an element substrate 10, and a top plate 15, that is, the outermost layer that has multiple nozzles. The heat generation resistors 13 are formed on the element substrate 10. The top plate 15 is placed on the element substrate 10 to cover the heat generation resistors 13 on the element substrate 10 so that the nozzles of the top plate 15 face the heat generation resistors 13 one for one.

The element substrate 10 is formed of a plate of silicon. There are the multiple heat generation resistors 13, and multiple electrical wires 14 which are in connection with the heat generation resistors 13 one for one, on the front surface of the element substrate 10. The liquid ejection element 1 is provided with an ink supply canal 11, which looks like a slit. In terms of the thickness direction of the element substrate 10, the ink supply canal 11 extends from the front surface of the element substrate 10 to the rear surface of the element substrate 10, and in terms of the lengthwise direction (Y direction) of the element substrate 10, the ink supply canal 11 extends from the center portion of one of its edges parallel to the widthwise direction of the element substrate 10, to the center portion of the other edge. The heat generation resistors 13 are arranged in two straight lines on the element substrate 10 so that one line of heat generation resistors 13 are on one side of the ink supply canal 11 and the other line of heat generation resistors 13 are on the other side of the ink supply canal 11, and also, so that the heat generation resistors 13 in one line are offset in the direction of the lines by << a pitch from the corresponding heat generation resistors 13 in the other line. To each end of each of the wires 14, one of through electrodes 12 is connected, which extend from the front surface of the element substrate 10 and to the rear surface of the element substrate 10. Each of the through electrodes 12 is formed with the use of the following method. That is, first, an electrode is formed in the precursor of the element substrate 10 so that it extends from the front surface of the precursor of the substrate 10 to a predetermined depth, in the direction perpendicular to the front (rear) surface of the precursor, and then, the precursor is reduced in thickness from the rear side of the precursor until the electrode is exposed from the rear side of the precursor.

The top plate 15 has multiple ejection orifices 17 which align with the heat generation resistors 13 one for one, and multiple ink channels 16 in which the heat generation resistors 13 are present, one for one, and which lead to the ink supply canal 11 on one side, and the ejection orifices 17, one for one, on the other side. The top plate 15 can be formed of a resin, for example.

The liquid ejection element 11 is mounted on a base plate (unshown), along with another substrate on which the circuit for supplying electric power to the heat generation resistors 13 in response to recording signals in order to drive the heat generation resistors 13, and various other elements, are disposed. The combination of the liquid ejection element 1, another substrate, and base plate constitutes an ink jet recording head. The additional substrate is positioned on the rear side of the liquid ejection element 1, and electric power is supplied to the heat generation resistors 13 from the power supply circuit on the additional substrate through the through electrodes 12 and electrical wires 14. The base plate has an ink outlet (unshown), one end of which is connected to the ink supply canal 11, and the other end of which is connected to an ink storage portion (unshown) which holds ink.

The ink in the ink storage portion is supplied to the ink supply canal 11, and fills each of the ink channels 16, remaining therein with a meniscus formed in each of the ejection orifices 17 due to the presence of capillary force. With the ink remaining in this condition, the heat generation resistors 13 are driven to heat the ink on the selected heat generation resistors 13 enough to cause the ink to generate bubbles so that ink is ejected from the ejection orifices 17, by the pressure generated by the growth of the bubbles.

Next, the steps in the process for manufacturing the liquid ejection element 1 in this embodiment will be described.

(Liquid Ejection Element Manufacturing Method 1)

Figure 2:
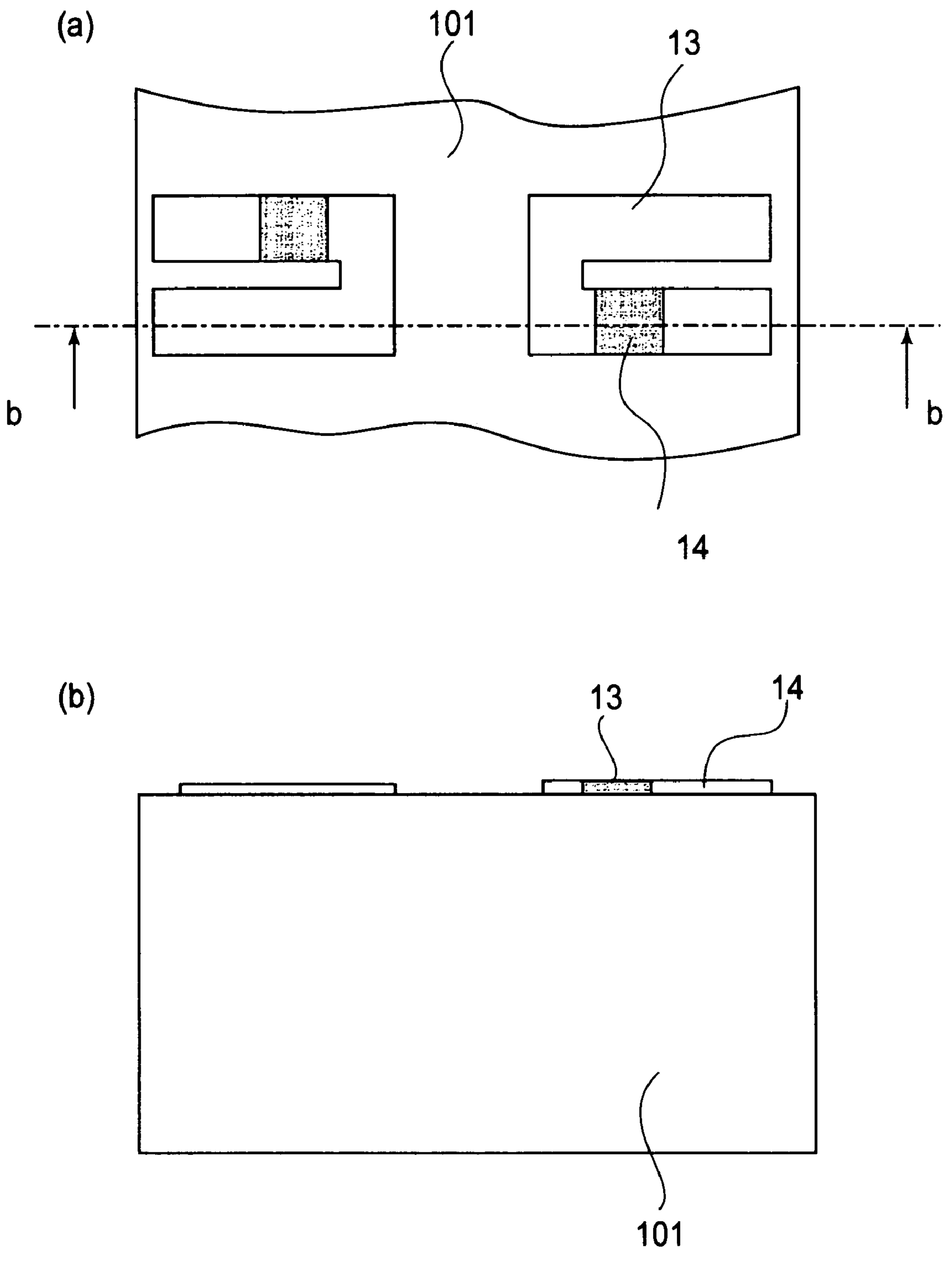
FIG. 2 is a schematic drawing for showing one of the steps of one (first) of the methods for manufacturing the liquid ejection element shown in FIG. 1.

Referring to FIG. 2, first, a film of TaN and a film of Al are formed by sputtering on the front surface of a silicon substrate 101, which is 625 μm in thickness, being thicker in this stage than at the completion of the liquid ejection element 1. Then, the heat generation resistors 13 and electrical wires 14 are formed in predetermined patterns from the films of TaN and Al, respectively, with the use of photo-lithographic technologies. The size of each heat generation resistor 13 is 30 μm×30 μm. If necessary, a protective layer (unshown) may be formed on the heat generation resistors 13 and electrical wires 14.

Figure 3:
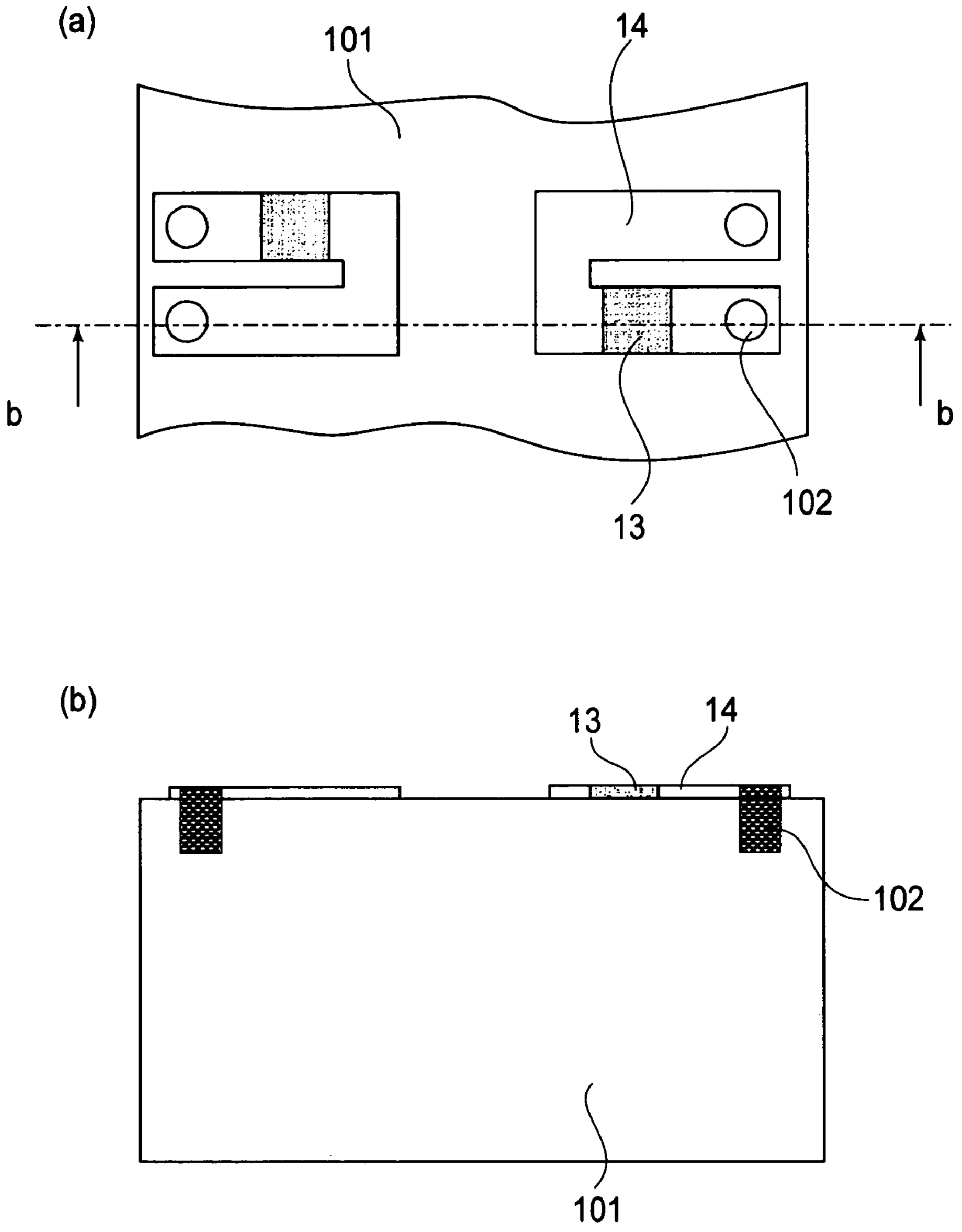
FIG. 3 is a schematic drawing for showing one of the steps of the first method for manufacturing method the liquid ejection element shown in FIG. 1.

Next, referring to FIG. 3, a blind hole is formed to a predetermined depth through each end portion of each electrical wire 14 and the corresponding portion of the silicon substrate 101. The predetermined depth means such a depth that will be greater than the thickness of the silicon substrate 101 after the thickness reduction of the silicon substrate 101. These holes can be formed by dry etching, laser processing, or the like. After the formation of these blind holes, a seed layer (unshown) for plating is formed on the internal surface of each blind hole. Then, each blind hole, the internal surface of which has been covered with the seed layer for plating, is filled with gold, by plating the internal surface of each blind hole with gold as the electrode material. As a result, each electrode 102 is formed, a part of which is embedded in the electric wire 14, being exposed on the front side of the silicon substrate 10, and the rest of which is embedded in the silicon substrate 101.

Each of the embedded electrodes 102 will eventually become a through electrode 12 (FIG. 1). Therefore, the diameter and depth of a blind hole may be chosen within a range in which the blind hole can be satisfactorily filled with the material for the through electrode, and also, the through electrode which will result from the filling of the blind hole will be precise in measurement. The depth of a blind hole, in other words, the measurement of the embedded electrode 102 in terms of the thickness direction of the silicon substrate 101, is desired to be in a range of 50 μm -300 μm. If this measurement is no less than 300 μm, it is possible that the holes for the embedded electrodes 102 will be formed with reduced accuracy in terms of position and perpendicularity, and also, it takes more time to process the silicon substrate 101 to form the through electrodes 12. On the other hand, if it is no more than 50 μm, the above described problems do not occur. However, the silicon substrate 101 must be rendered thinner by a greater amount to turn the embedded electrodes 102 into through electrodes 12. Therefore, it is possible that the silicon substrate 101 will be difficult to handle after its thickness reduction. As long as the depth of each blind hole is within the aforementioned range, and the diameter of each blind hole is no less than 25 μm, the blind holes can be satisfactorily filled with the material for the through electrode 12. The larger the diameter of each blind hole, the more satisfactorily each blind hole will be filled with the electrode material. However, there is the upper limit to the blind hole diameter, which is dependent on the pitch at which the heat generation resistors 13 are arranged, in other words, the pitch at which the precursor 102 of each through electrode 12 is embedded. In this embodiment, the blind hole for each through electrode precursor 102 is formed so that it will be 25 μm in diameter and 300 μm in the depth from the surface of the silicon substrate 101.

Figure 4:
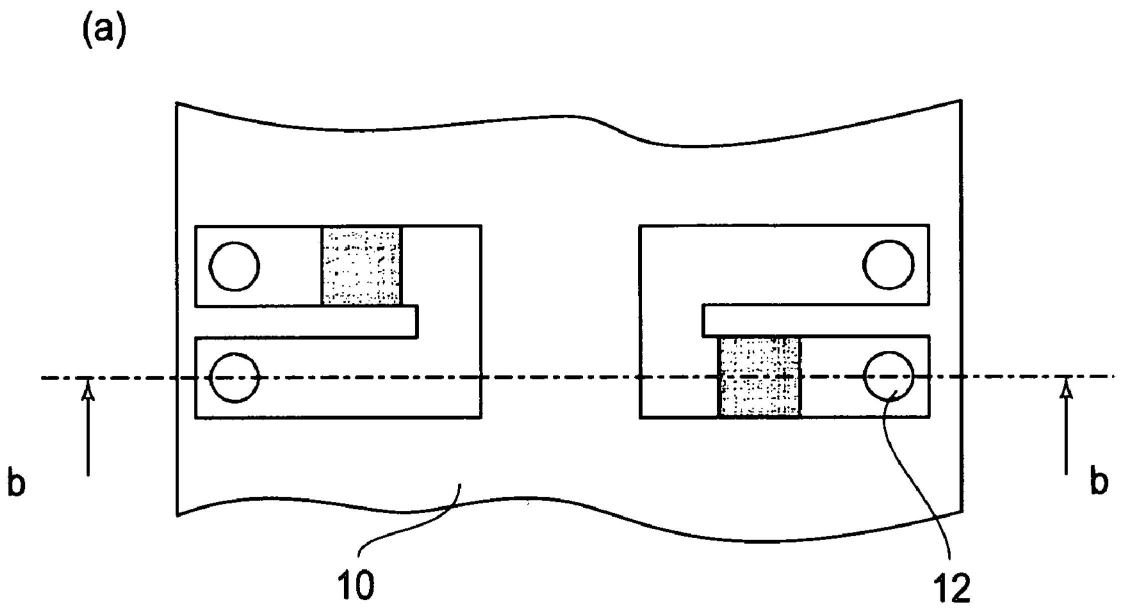
FIG. 4 is a schematic drawing for showing one of the steps of the first method for manufacturing the liquid ejection element shown in FIG. 1.
Figure 4:
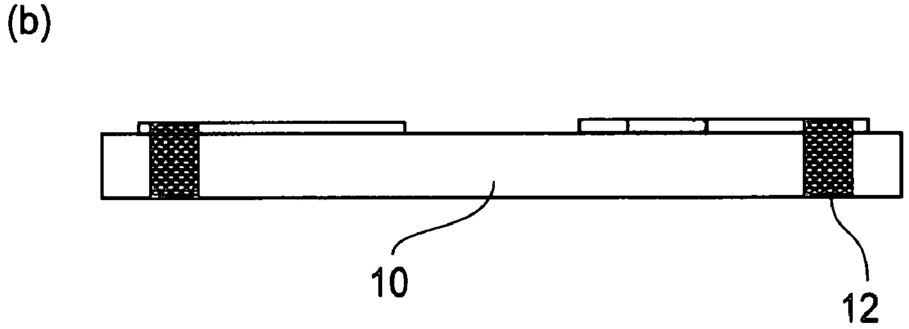

Next, the silicon substrate 101 is reduced in thickness from the rear side to expose the embedded electrodes 102 from the rear side of the substrate 101. As for the method for reducing the silicon substrate 101 in thickness, various technologies for reducing this type of substrate in thickness can be used. For example, there is a method in which a substrate is roughly ground through a mechanical process, and then, it is finely ground through a chemical-mechanical process, so that it is precisely reduced to a predetermined thickness. As the silicon substrate 101 is reduced in thickness as described above, the embedded electrodes 12 (FIG. 3) are exposed on the rear side of the silicon substrate 101. In other words, the embedded electrodes 102 are turned into the through electrodes 12, which extend from the front surface of the silicon substrate 101 to the rear thereof, as shown in FIG. 4. This process of reducing in thickness the silicon substrate 101 to a predetermined value yields the element substrate 10 in the final form. In this embodiment, the thickness of the element substrate 10 is set to 300 μm. However, it is desired to be set to a value in the range of 50 μm-300 μm, according to the depth of the blind holes.

The element substrate 10 in the final form, which is obtained by reducing in thickness the silicon substrate 101, in which the precursor 102 (embedded electrodes) of the through electrodes 12 were formed in advance, is virtually flawlessly flat on the rear side, ensuring that the element substrate 10 is securely held during the liquid ejection element manufacturing steps thereafter. With the element substrate 10 securely held, the portions of the liquid ejection element, which are to be formed thereafter, can be formed at a higher level of accuracy. In comparison, in the case of a method in which the heat generation resistors 13 are formed on the silicon substrate 101 prior to the formation of the through holes which are to be filled with the material for the through electrodes 12 to form the through electrodes 12, it is possible that the front and rear surfaces of the silicon substrate 101 will be made uneven, although very slightly, by the step of filling the through holes with the electrode material, and/or the step of forming the abovementioned seeding layer for plating. This unevenness, in particular, the unevenness of the rear surface of the element substrate 10, makes it difficult to securely hold the element substrate 10 during the following steps in the liquid ejection element manufacture, and therefore, making it sometimes impossible to form, at a higher level of accuracy, the portions of the liquid ejection element which are to be formed thereafter.

Figure 5:
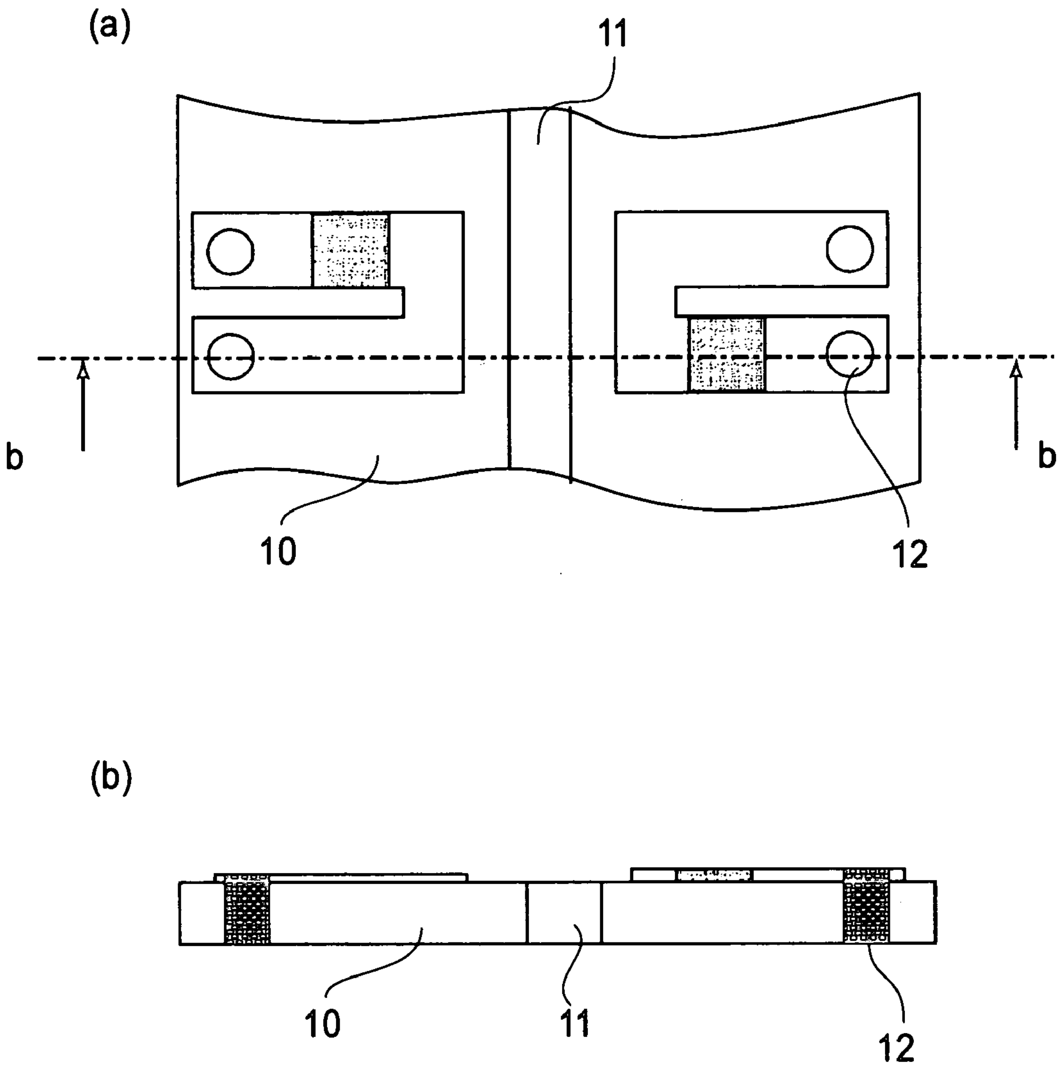
FIG. 5 is a schematic drawing for showing one of the steps of the first method for manufacturing the liquid ejection element shown in FIG. 1.
Figure 6:
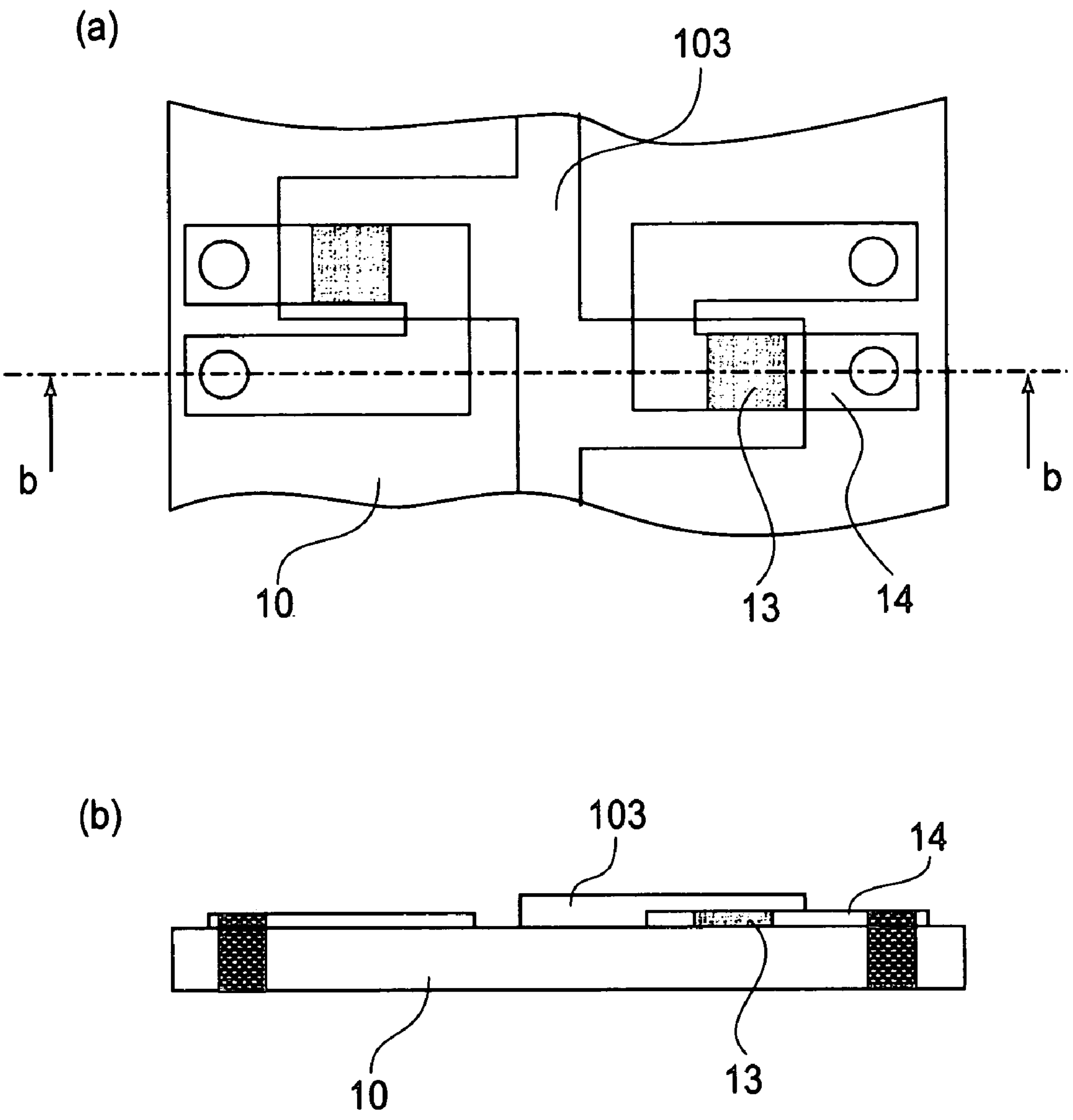
FIG. 6 is a schematic drawing for showing one of the steps of the second method for manufacturing the liquid ejection element shown in FIG. 1.

Next, referring to FIG. 5, the ink supply canal 11, which extends from the front surface of the element substrate 10 to the rear surface of the element substrate 10, is formed with the use of the following method, for example. That is, first, a layer of etching mask is formed on the rear surface of the element substrate 10, and the portion of the masking layer, which corresponds in position to the ink supply canal 11, is removed with the use of a pattern. Then, the ink supply canal 11 is formed by dry etching. Lastly, the masking layer is removed. Incidentally, the ink supply canal 11 may be formed with the use of a laser-based process.

After the formation of the ink supply canal 11, the top plate 15, in which the ink channels 16 and orifices 17 were formed in advance, is bonded to the front surface of the element substrate 10, as shown in FIG. 1. The top plate 15 can be made of a piece of resin film, and the ink channels 16 and orifices 17 can be formed by processing this film by a beam of laser light.

The liquid ejection element 1 is manufactured through the above described manufacturing sequence. When the above described manufacturing method in this embodiment is used for manufacturing the liquid ejection element 1, the holes (blind holes) formed for the through electrodes 12 do not need to be as deep as those formed for the through electrodes 12 when the manufacturing method in accordance with the prior art is used. Therefore, the silicon substrate 101 can be processed at a higher level of accuracy in terms of the position and measurements of the holes for the through the electrodes 12. Therefore, the through electrodes 12 can be arranged at a substantially higher density. Consequently, using the liquid ejection element manufacturing method in this embodiment to manufacture a liquid ejection element with a certain specification, which used to be manufactured with the use of a liquid ejection element manufacturing method in accordance with the prior art, makes it possible to reduce the element substrate 10 in surface area, and also, in the length of time required to process the silicon substrate 101 to form the holes for the through electrodes 12, compared to using the method in accordance with the prior art. In other words, the method in this embodiment can manufacture the element substrate 10 with higher efficiency, making it thereby possible to reduce the manufacturing cost for the element substrate 10. With the reduction in the surface area and manufacturing cost of the element substrate 10, it is possible to reduce the liquid ejection element 1 itself in surface area and manufacturing cost. Further, while the electrodes are formed, the thickness of the silicon substrate 101 remains the same as that at the beginning of the manufacture of the liquid ejection element 1, making it possible to prevent such a problem, or the like, that the silicon substrate 101 becomes damaged as it is handled while the electrodes are formed.

Further, the liquid ejection element manufacturing method in this embodiment forms the ink supply canal 11 after the thinning of the silicon substrate 101. Therefore, it can form the ink supply canal 11 at a higher level of positional accuracy, making it possible to manufacture a liquid ejection element, which is more accurate in the distance between the ink supply canal 11 and each of the heat generation resistors 13, being therefore superior in ink ejection characteristics, than a liquid ejection element which can be formed by the liquid ejection element manufacturing method in accordance with the prior art. Further, according to the liquid ejection element manufacturing method in this embodiment, the electrical connection between the components on the element substrate 10 and those on the substrate of another element is made through the through electrodes 12, on the rear side of the element substrate 10, making it possible to eliminate the electrical components, which will be protruding from the front surface of the element substrate 10 if the method in accordance with the prior art is used. Therefore, it is possible to reduce the distance between recording medium and each of the liquid ejection orifices 17 to a value substantially smaller than the value achievable when the abovementioned electrical connection is made on the front side of the liquid ejection element 1. The smaller the distance between recording medium and each of the liquid ejection orifices 17, the higher the level of the positional accuracy at which each of the ink droplets ejected from the ejection orifices 17 lands on the recording medium, and therefore, the higher the level of quality at which recording is made by the liquid ejection element 1.

(Liquid Ejection Element Manufacturing Method 2)

In the case of the liquid ejection element manufacturing method described above, the top member 15 is formed by processing a piece of resin film with a beam of laser light. However, the top member 15 can also be formed by coating the silicon substrate 101 with resinous substance. Next, the liquid ejection element manufacturing method in which the top member 15 is formed by coating the silicon substrate 101 with resinous substance will be described, with reference to FIGS. 6-9.

This manufacturing method is the same as the preceding manufacturing method 1, up to the step in which the through electrodes are effected by reducing the silicon substrate 101 in thickness, that is, the step shown in FIG. 4. After the step shown in FIG. 4, the front side of the element substrate 10, on which the heat generating resistors 13 and electrical wires 14 have been formed, is coated with positive resist to a thickness of 15 μm, and the resultant layer of resist is turned into the ink channel pattern layer 103, shown in FIG. 6, by the process of exposing the resist layer using a predetermined pattern, and developing the exposed resist layer.

This ink channel pattern layer 103 is coated with photosensitive epoxy resin (negative resist) to a thickness of 30 μm. Then, the portions of this epoxy resin layer, which correspond in position to the heat generation resistors 13, one for one, with the presence of the ink channel pattern layer 103 between the epoxy resin layer and heat generation resistors 13, are removed by the exposing process and developing process, effecting multiple ejection orifices 17.

Figure 7:
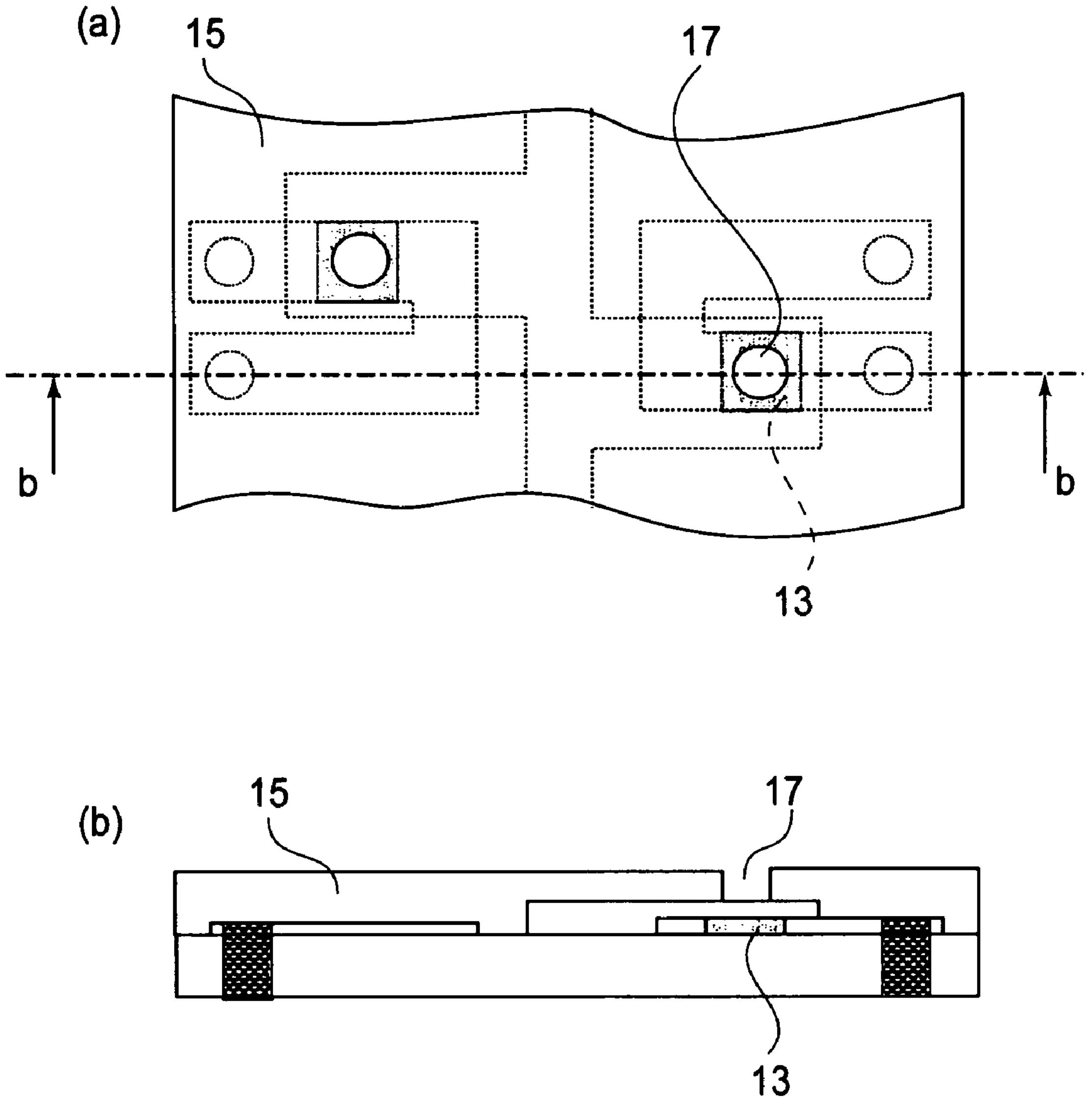
FIG. 7 is a schematic drawing for showing one of the steps of the second method for manufacturing the liquid ejection element shown in FIG. 1.

In other words, a top plate 15 shown in FIG. 7 is formed. The diameter of each ejection orifice 17 is 25 μm.

Figure 8:
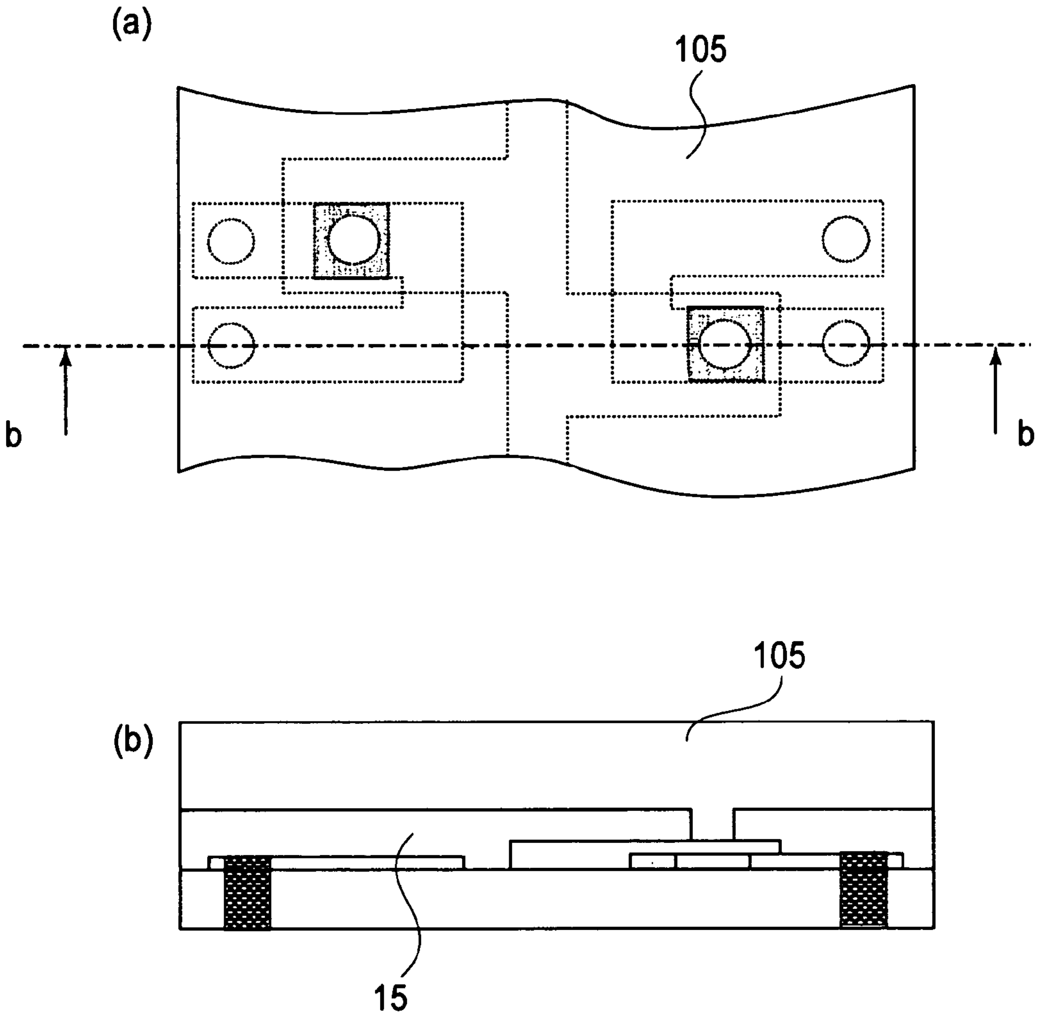
FIG. 8 is a schematic drawing for showing one of the steps of the second method for manufacturing the liquid ejection element shown in FIG. 1.
Figure 9:
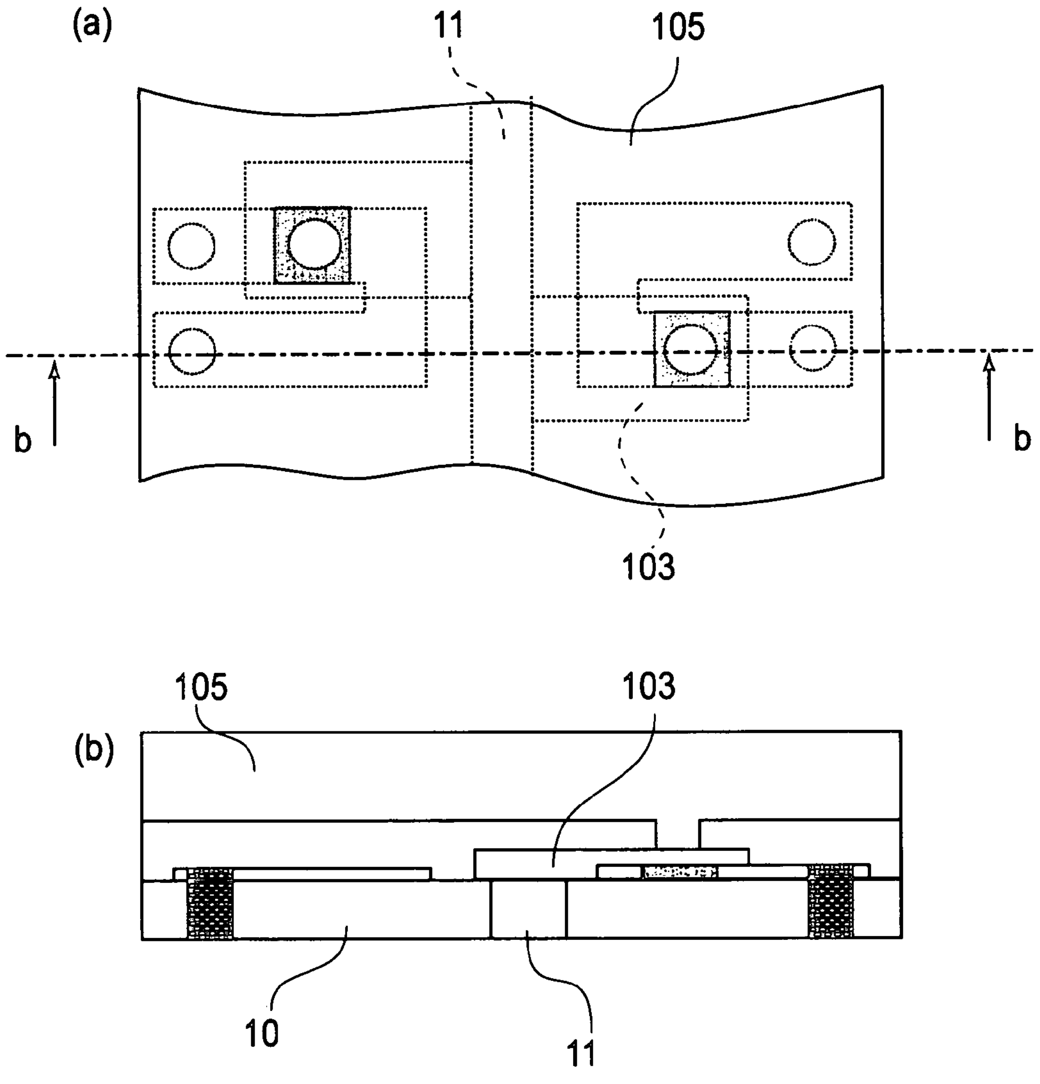
FIG. 9 is a schematic drawing for showing one of the steps of the second method for manufacturing the liquid ejection element shown in FIG. 1.
Figure 10:
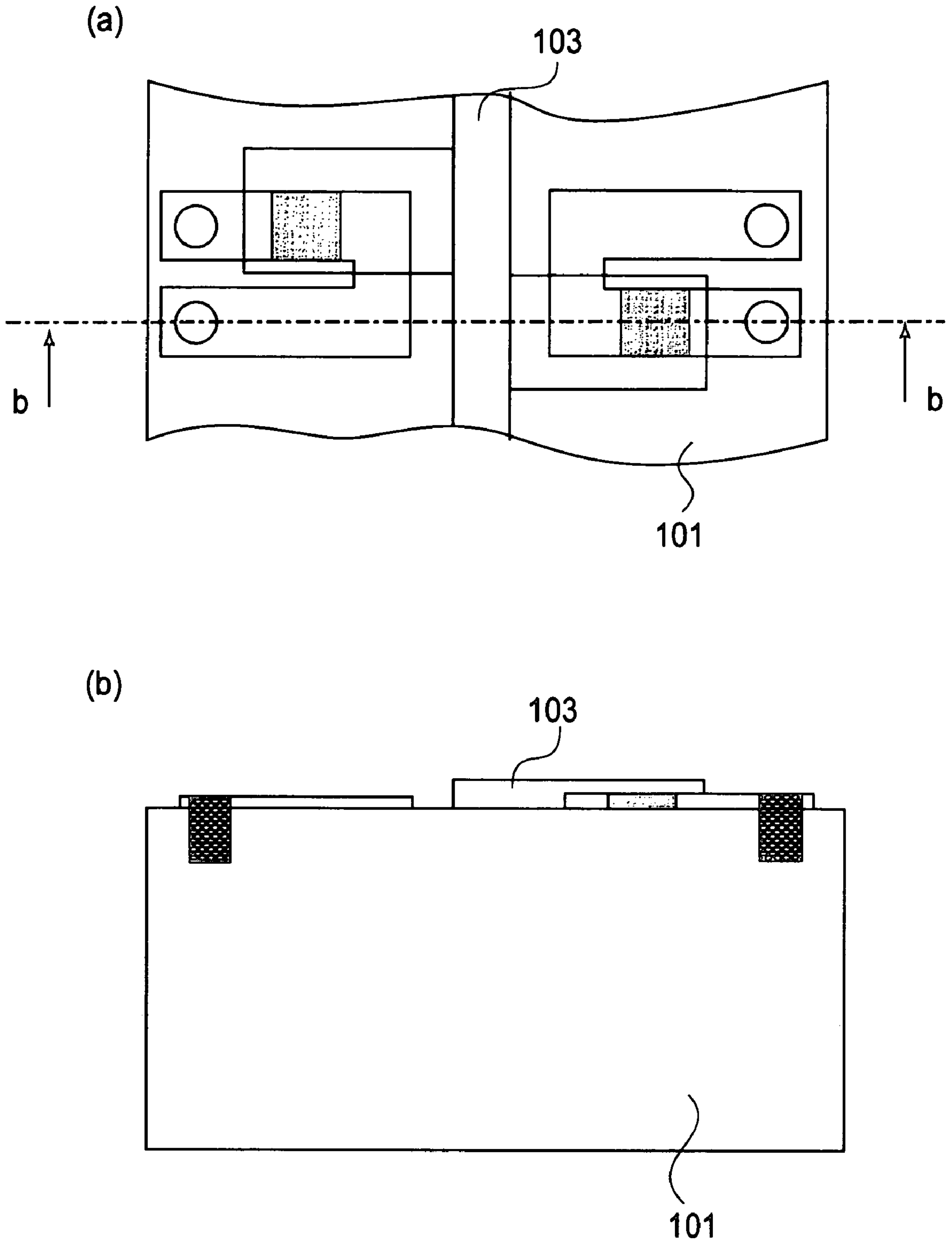
FIG. 10 is a schematic drawing for showing one of the steps of the third method for manufacturing method the liquid ejection element shown in FIG. 1.

Next, referring to FIG. 8, the top surface of the top plate 15 is coated with resin to form a protective layer 105 on the top plate 15. Next, referring to FIG. 9, after the formation of the protective layer 105, the ink supply channel 11 is formed in the element substrate 10. As for the method for forming the ink supply canal 11, the ink supply canal 11 may be formed by forming a masking layer in the form of a predetermined pattern, on the rear side of the element substrate 10, and dry etching the element substrate 10 from the rear side of the element substrate 10. In such a case, the liquid channel pattern layer 103 functions as an etching stopper layer. Lastly, the liquid channel pattern layer 103 and protective layer 105 are removed to yield the liquid ejection element 1 shown in FIG. 1.

According to this liquid ejection element manufacturing method, the top plate 15 can be formed at a higher level of accuracy than according to the liquid ejection element manufacturing method in the preceding methods. That is, not only can the liquid channels 16 and ejection orifices 17 be more accurately formed in terms of their measurements, but also, they can be more accurately positioned relative to the heat generating resistors 13. In other words, this liquid ejection element manufacturing method can be satisfactorily used to manufacture even a liquid ejection element that ejects liquid droplets substantially smaller than those ejected by the liquid ejection element formed by the preceding methods. Incidentally, there has been a trend to reduce an ink jet head in the size of an ink droplet ejected by an ink jet head in order to make it possible to record at a higher level of precision with the use of an ink jet head. However, the smaller the liquid droplet, the smaller the kinetic energy it possesses, and therefore, the lower in the level of positional accuracy at which it lands on the recording medium. Thus, being capable of forming the top plate 15 at a higher level of accuracy is advantageous in consideration of the above-mentioned trend.

(Liquid Ejection Element Manufacturing Method 3)

In consideration of the level of ease at which the liquid ejection element substrate can be handled, it is desired that the step for reducing the liquid ejection element substrate in thickness is carried out as late as possible in the liquid ejection element manufacturing process. Next, therefore, this liquid ejection element manufacturing method which is superior to the preceding method, in terms of the level of ease at which the liquid ejection element substrate can be handled, will be described.

Up to the step for forming the precursors 102 (embedded electrodes) of the through electrodes 12, that is, the step shown in FIG. 3, this method is the same as the first method. Thereafter, positive resist is coated on the silicon substrate 101, on the side having the heat generating resistors 13 and electrical wires 14, to a thickness of 15 μm. Then, the resultant layer of resist is turned into the liquid channel pattern layer 103 by the process of exposing the resist layer, using the pattern for forming the ink channels 16 (FIG. 1), and developing the exposed resist layer.

Figure 11:
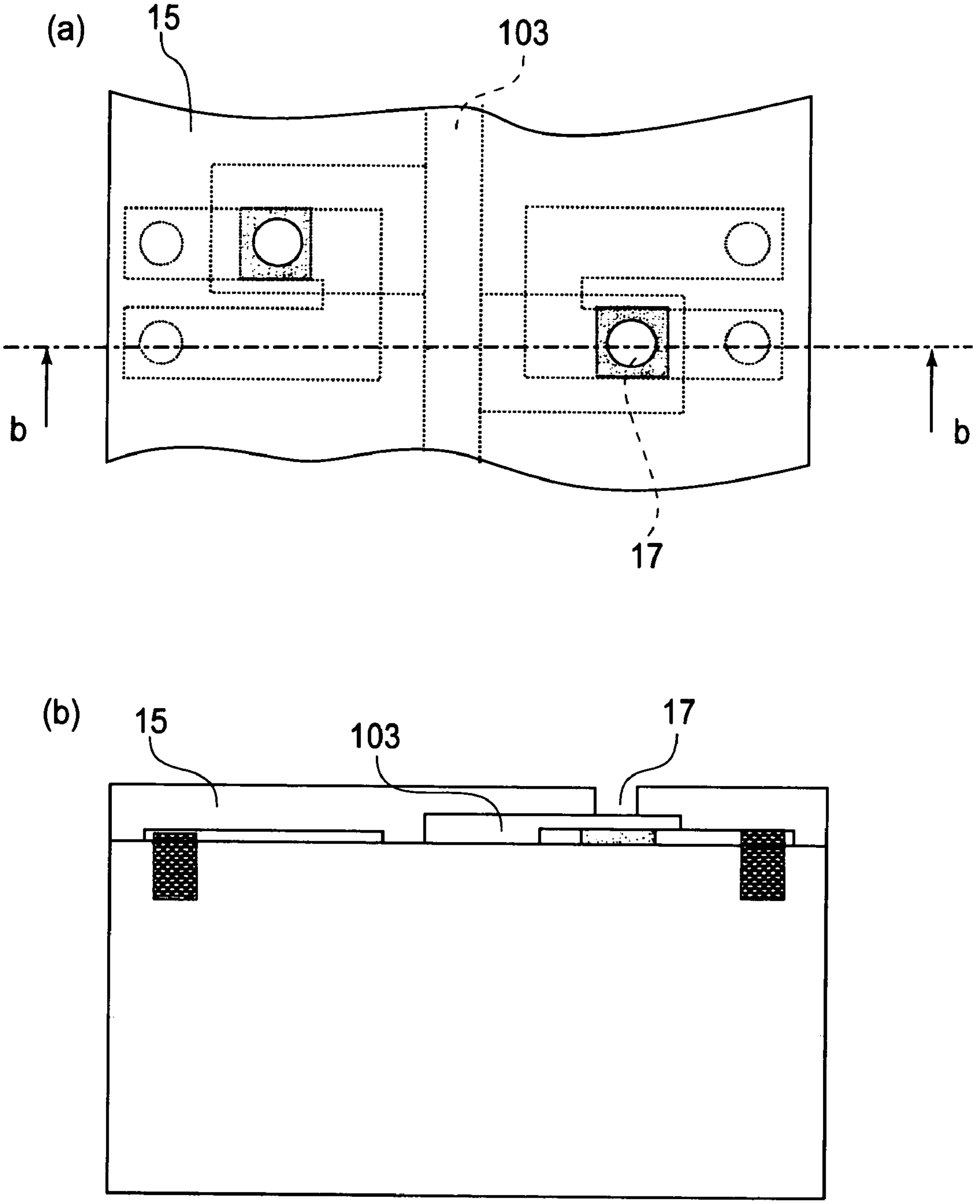
FIG. 11 is a schematic drawing for showing one of the steps of the third method for manufacturing the liquid ejection element shown in FIG. 1.

Then, the silicon substrate 101 is coated by the photosensitive epoxy resin (negative resist) to a thickness of 30 μm, on the side having the liquid channel pattern layer 103, covering thereby the liquid channel pattern layer 103. Then, the portions of this epoxy resin layer, which correspond in position to the heat generation resistors 13, one for one, with the presence of the ink channel pattern layer 103 between the epoxy resin layer and heat generation resistors 13, are removed by the exposing process and developing process, effecting multiple ejection orifices 17. In other words, a top plate 15 shown in FIG. 11 is formed. The diameter of each ejection orifice 17 is 25 μm.

Figure 12:
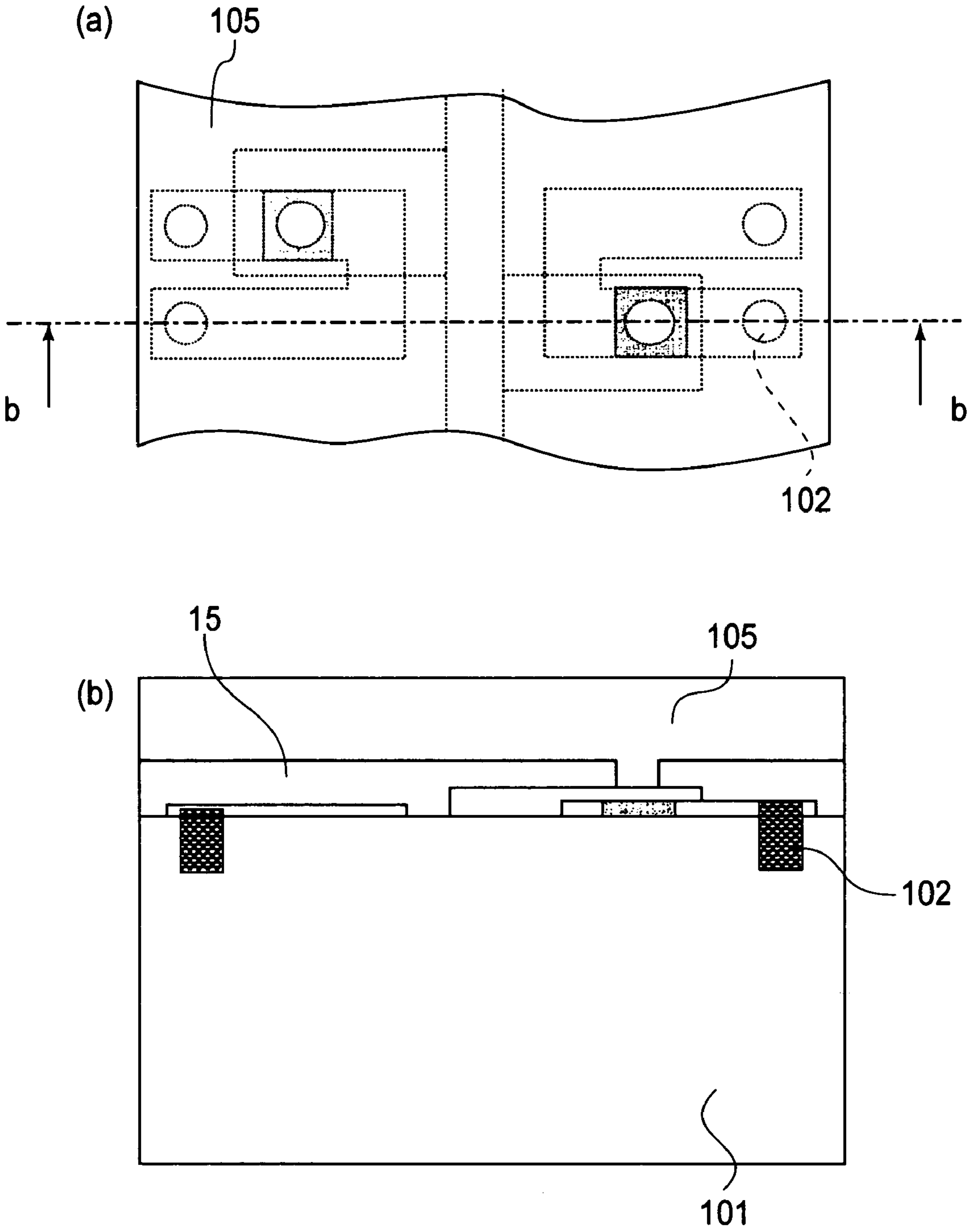
FIG. 12 is a schematic drawing for showing one of the steps of the third method for manufacturing the liquid ejection element shown in FIG. 1.
Figure 13:
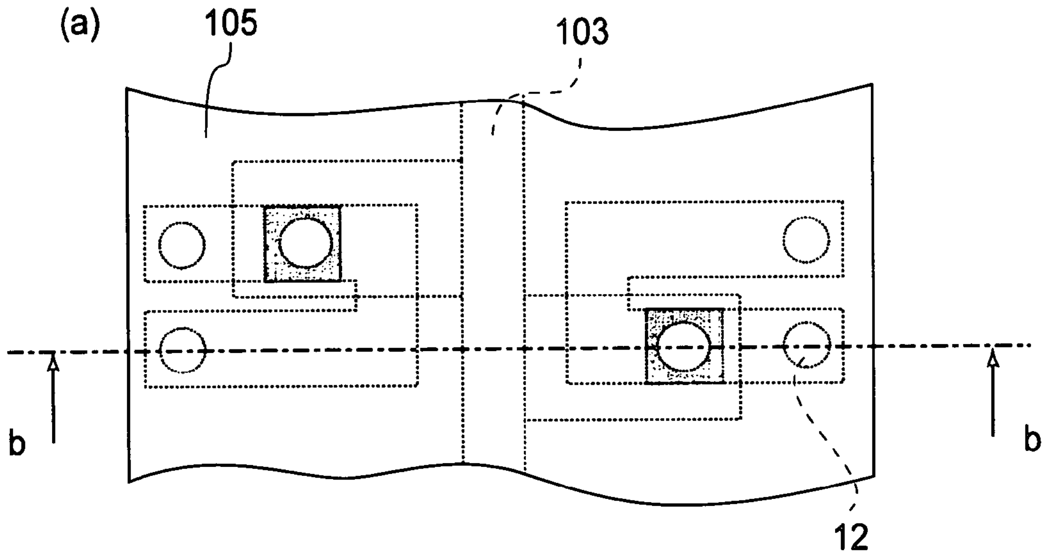
FIG. 13 is a schematic drawing for showing one of the steps of the third method for manufacturing the liquid ejection element shown in FIG. 1.
Figure 13:
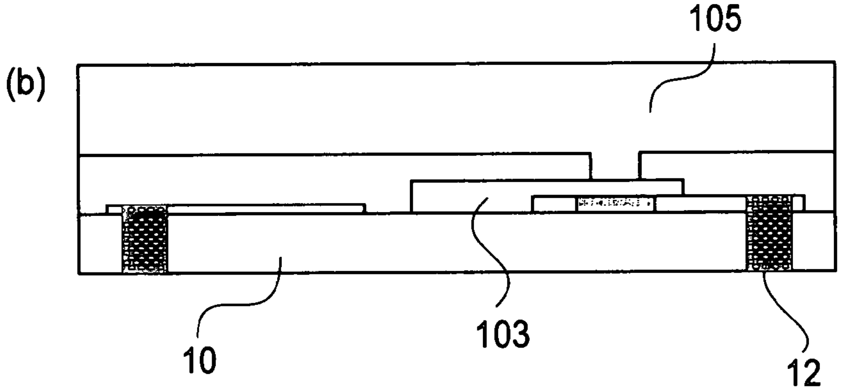

Next, referring to FIG. 12, the top surface of the top plate 15 is coated with resin to form a protective layer 105 on the top plate 15. Next, referring to FIG. 13, after the formation of the protective layer 105, the silicon substrate 101 is reduced in thickness from the rear side to expose the precursor 102 (embedded electrodes) of the through electrodes 12, yielding thereby the element substrate 10 having the through electrodes 12, shown in FIG. 13. As for the method for reducing the silicon substrate 101 in thickness, the same method as the one used by the first method can be used.

Thereafter, the ink supply channel 11 is formed in the element substrate 10 as it is by the above described second manufacturing method, and then, the liquid channel pattern layer 103 and protective layer 105 are removed, yielding the liquid ejection element 1 shown in FIG. 1.

This liquid ejection element method is smaller in the number of steps to be carried out after the completion of the element substrate 10, being therefore better in terms of ease of handling, than the above described second manufacturing method.

(Liquid Ejection Element Manufacturing Method 4)

Referring to FIG. 1, all of the through electrodes 12 and ink supply canal 11 are formed so that they extend from the front surface of the element substrate 10 to the rear surface of the element substrate 10. Thus, if it is possible to form the holes for forming the through electrodes 12 and the ink supply canal 11 in the same step, it is possible to simplify the liquid ejection element manufacturing process, which is desired to be as simple as possible. Next, this manufacturing method, that is, one of the examples of a liquid ejection element manufacturing methods, in which the holes for forming the through electrodes 12, and the ink supply canal 11, are formed in the same step, will be described.

Figure 14:
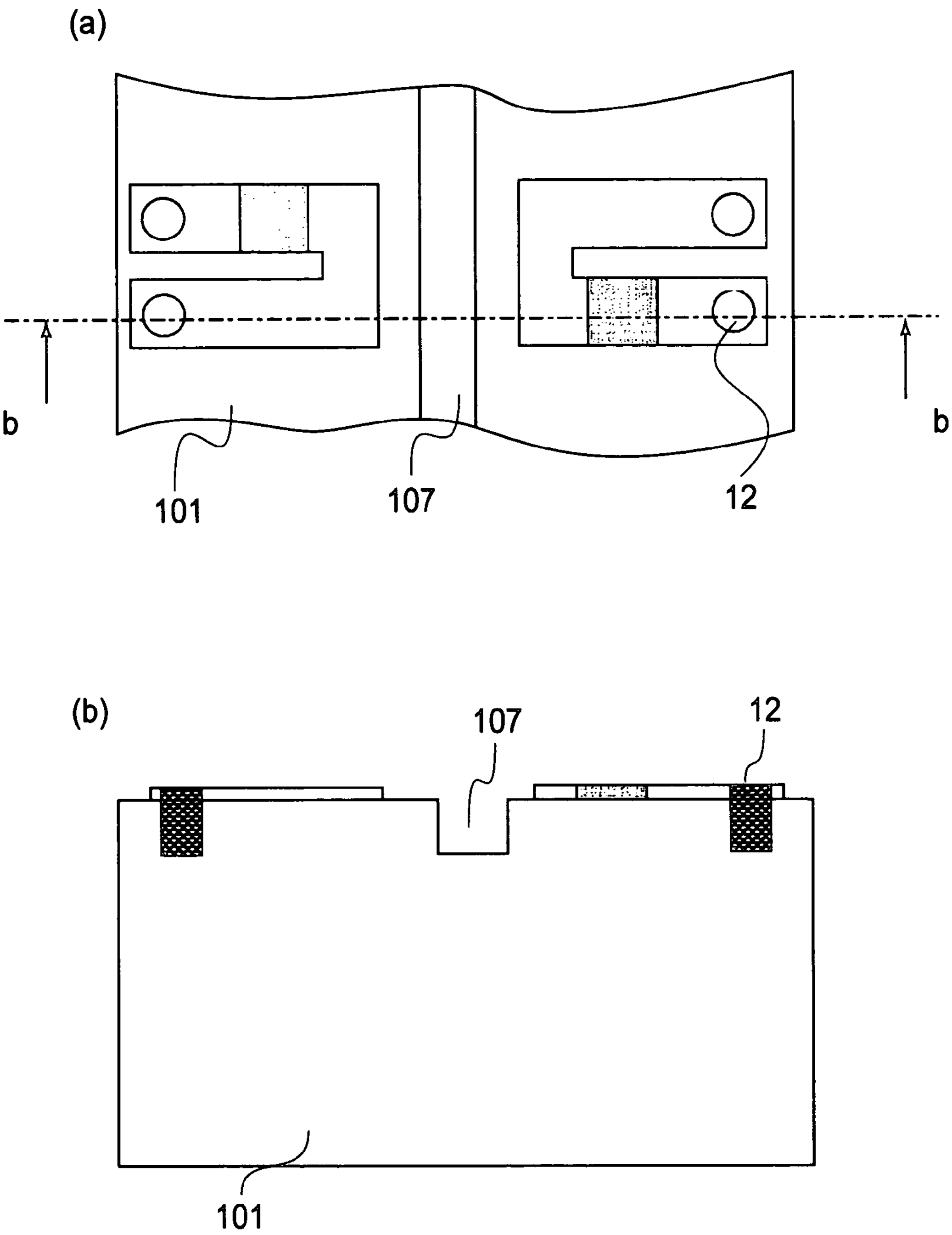
FIG. 14 is a schematic drawing for showing one of the steps of the fourth method for manufacturing the liquid ejection element shown in FIG. 1.

Up to the step for forming the heat generating resistors 13 and electric wires 14 on the silicon substrate 101, that is, the step shown in FIG. 2, this method is the same as the first method. Thereafter, the blind holes for forming the precursor 102 (embedded electrodes) of the through electrodes 12, and the groove 107 (precursor of the ink supply canal 11), are etched into the silicon substrate 101, from the portions of the front surface of the silicon substrate 101, which coincide with the theoretical top ends of the through electrodes 12 and ink supply canal 11, respectively, in the same step, as shown in FIG. 14. The step for forming the blind holes for embedding precursor 102 of the through electrodes 12, may be separate from the step for forming the groove 107 (precursor of ink supply canal 11). However, the liquid ejection element manufacturing process can be simplified by forming all of them in the same step. As for the method for forming these blind holes, the holes may be created by dry etching, laser-based process, or the like. Thereafter, the blind holes for embedding the precursor 102 of the through electrodes 12 are filled with the electrode material, as they are in the first method, in order to form, in the blind holes, the precursor 102 of the through electrodes 12, one end of each of which is exposed at the front surface of the silicon substrate 101. The depth of each blind hole in which the precursor 102 of the through electrode 12 is formed, and the depth of the groove 107 for forming the ink supply canal 11, are the same as the depth of those formed by the first method.

Then, the silicon substrate 101 is reduced in thickness from the rear side of the silicon substrate 101, exposing the embedded electrode 102 from the rear side of the silicon substrate 101 (element substrate 10), and making the groove 107 into a through hole (in terms of thickness direction of silicon substrate (element substrate)), which extends from the front side of the element substrate 10 to the rear side of the element substrate 10. In other words, this manufacturing method makes it possible to form in the same step, the through electrodes 12 and ink supply canal 11, which are structured as shown in FIG. 5. As for the method for reducing the silicon substrate 101 in thickness, the same process as the one used by the first method can be used. Thereafter, the top member 15 is bonded to the top side of the element substrate 10 as it is by the first method, yielding thereby the liquid ejection element 1 shown in FIG. 1.

As described above, according to each of the preceding liquid ejection element manufacturing methods in accordance with the present invention, precursors 102 of a through electrode are formed in the blind holes of the silicon substrate 101, and then, the silicon substrate 101 is reduced in thickness to turn the precursor 101 (embedded electrode) into the through electrodes 12. Therefore, the through electrodes 12 can be formed more efficiently and at a higher level of accuracy, than according to any of the liquid ejection element manufacturing methods in accordance with the prior art. In other words, it greatly contributes to reducing the liquid ejection element 1 in size and manufacturing cost.

Incidentally, the preceding liquid ejection element manufacturing methods were described with reference to the liquid ejection element 1, the heat generating resistors 13 of which were arranged in two straight lines. However, the arrangement of the heat generation resistors 13 does not need to be limited to the above described manner. Also in the case of the above described liquid ejection element 1, the heat generating resistor 13, which gives thermal energy to ink, is used as the energy generating member. However, an electromechanical transducer such as a piezoelectric element, which gives ejection energy to ink by mechanically vibrating ink, may be used as the energy generating member.

Next, referring to FIG. 15, an example of an ink jet recording apparatus to which the present invention is applicable with good results will be described.

Figure 15:
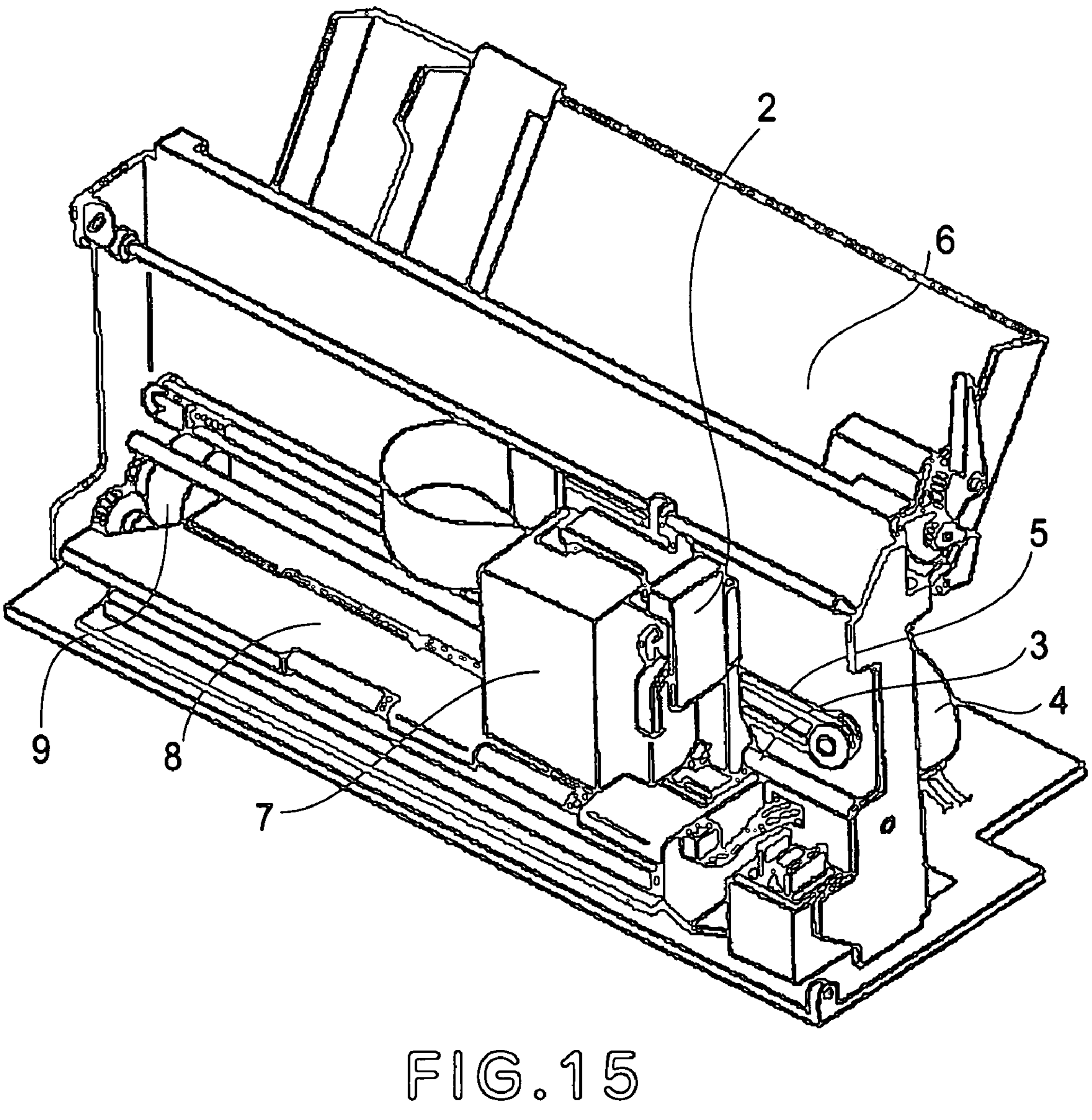
FIG. 15 is a perspective view of a typical ink jet recording apparatus to which the present invention is applicable with good results.

The ink jet recording apparatus shown in FIG. 15 is an ink jet recording apparatus of the serial type. It has: a carriage 2 reciprocally movable along a guide shaft 3 supported by the frame of the ink jet recording apparatus; an automatic sheet feeding apparatus 6 which holds in layers multiple sheets of recording medium, that is, objects on which recording is made, and which feeds one by one the sheets of recording medium therein into the main assembly of the apparatus; and a sheet conveyance mechanism made up of various rollers such as conveyance rollers, sheet discharge rollers, etc., for conveying the sheets of recording medium sent from the automatic sheet feeding apparatus 6, etc. To the carriage 2, a part of a timing belt 5 which is driven by the rotation of a carriage motor 4 is attached. Thus, as the carriage motor 4 is rotated forward or in reverse, the carriage 2 is moved forward or in reverse, respectively, along the guide shaft 3. The carriage 2 holds an ink jet cartridge 7, which is removably mountable on the carriage 2. The ink jet cartridge 7 is an integral combination of a recording head which comprises the above described liquid ejection element 1 (FIG. 1), and an ink container filled or refilled with the ink which is to be supplied to the recording head. The recording head is mounted on the carriage 2 so that ink is ejected downward. Incidentally, if the ink jet recording apparatus is a monochromatic recording apparatus, the recording head has only a single liquid ejection element 1, whereas if it is a multi-color recording apparatus, the recording head has multiple liquid ejection elements 1, the number of which matches the number of various inks to be ejected by the recording head. Also in the case of a multi-color recording apparatus, the recording head is provided with multiple ink containers, the number of which also matches the number of various inks to be ejected by the recording head.

After being fed from the automatic sheet feeding apparatus 6, each sheet of recording medium is conveyed by the sheet conveyance mechanism in the direction intersectional to the direction in which the carriage 2 is reciprocally moved, so that the sheet of recording medium moves along the top surface of a platen 8 disposed so that it faces the recording head of the ink jet cartridge 7. The automatic sheet feeding apparatus 6 and sheet conveyance mechanism are driven by a feed motor 9.

Recording is made on the sheet of recording medium by reciprocally moving the carriage 2 while ejecting ink droplets from the recording head. As for the movement of the sheet of recording medium, the sheet of recording medium is intermittently conveyed at a predetermined pitch, that is, it is conveyed at a predetermined pitch each time the movement of the carriage 2 in one direction is completed, or each time the single reciprocal movement of the carriage 2 is completed. As a result, recording is made across the entirety of the sheet of recording medium.

In the preceding embodiment of the present invention, the ink jet cartridge 7 is an integral combination of the recording head and ink container. However, the ink jet cartridge 7 may be structured so that the recording head and ink container can be separated from each other to allow the ink container to be replaced as it is completely depleted of the ink therein.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 210087/2004 filed Jul. 16, 2004 which is hereby incorporated by reference.

What is claimed is:

1. A manufacturing method for manufacturing a liquid ejection element substrate for a liquid ejection element for ejecting liquid through an ejection outlet, said liquid ejection element substrate having a front side and back side including an energy generating element for generating energy for ejecting the liquid and an electrode for supplying electric power to the energy generating element, said method comprising:

a step of forming on the front side of said substrate an energy generating element and wiring electrically connecting with said energy generating element;

a step of forming a recess in the form of a groove on said side of the substrate at a position where said wiring is formed;

a step of forming an embedded electrode electrically connected with said wiring by filling electrode material in said recess; and a step of thinning said substrate at the back side of said substrate after formation of said embedded electrode to expose said embedded electrode at the back side of said substrate, thus providing an electrode exposed at the back side of said substrate.

2. A method according to claim 1, wherein said substrate has a thickness of 50 μm-300 μm after said thinning step.

3. A method according to claim 1, further comprising a step of forming, before said thinning step, a second recess which is different from said recess on said side of the substrate, wherein in said step of thinning said substrate, said second recess penetrates from the front side to the back side of said substrate, thus providing, in said substrate, a supply port for supplying the liquid to be ejected.

4. A manufacturing method for manufacturing a liquid ejection element having a liquid ejection element substrate having a front side and a back side and including a liquid flow path which is open at an ejection outlet for ejecting liquid, an energy generating member for generating energy usable for ejecting the liquid from liquid flow path through the ejection outlet, and an electrode for supplying electric power to said energy generating element, said manufacturing method comprising:

a step of forming on the front side of said substrate an energy generating element and wiring electrically connecting with said energy generating element;

a step of forming a recess in the form of a groove on said front side of the substrate at a position where said wiring is formed;

a step of forming an embedded electrode electrically connected with said wiring by filling electrode material in said recess;

a step of thinning said substrate at the back side of said substrate after formation of said embedded electrode to expose said embedded electrode at the back side of said substrate, thus providing an electrode exposed at the back side of said substrate; and a step of providing a top plate member forming said ejection outlet and said liquid flow path on said side of the substrate on which said energy generating element and said wiring have been formed.

5. A method according to claim 4, wherein said top plate member providing step is carried out after said thinning step.

6. A method according to claim 5, wherein said top plate member providing step including a step of bonding on said side of said substrate a resin film in which said liquid flow path and said ejection outlet are already formed.

7. A method according to claim 6, further comprising a step of forming, before said thinning step, a second recess which is different from said recess on said side of the substrate, wherein in said step of thinning said substrate, said second recess penetrates from the front side to the back side of said substrate, thus providing, in said substrate, a supply port for supplying the liquid to be ejected.

8. A method according to claim 4, wherein said top plate member providing step includes a step of forming resist at a position where said liquid flow path is to be formed, a step of forming said ejection outlet in said photosensitive resin material by application of photosensitive resin material on the resist, exposure and development thereof, and a step of forming said liquid flow path by removing the resist after said ejection outlet forming step.

9. A method according to claim 8, further comprising a step of forming, after said resist forming step, a supply port, penetrating said substrate, for supplying liquid to be ejected to said liquid flow path from the back side of said substrate.

* * * * *

UNITED STATES PATENT AND TRADEMARK OFFICE

CERTIFICATE OF CORRECTION

PATENT NO. : 7,343,679 B2
APPLICATION NO. : 11/179622
DATED : March 18, 2008
INVENTOR(S) : Hirokazu Komuro It is certified that error appears in the above-identified patent and that said Letters Patent is hereby corrected as shown below:

COLUMN 3:

Line 28, "of one the" should read --of one of the--;
Line 37, "method" (second occurrence) should be deleted; and
Line 59, "method" (second occurrence) should be deleted.

COLUMN 6:

Line 7, "silicon substrate 10," should read --element substrate 10,--.

COLUMN 7:

Line 50, "through the" should read --through--.

COLUMN 9:

Line 6, "channel 11" should read --canal 11--.

COLUMN 10:

Line 16, "channel 11" should read --canal 11--; and
Line 37, "methods," should read --method,--.

UNITED STATES PATENT AND TRADEMARK OFFICE

CERTIFICATE OF CORRECTION

PATENT NO. : 7,343,679 B2
APPLICATION NO. : 11/179622
DATED : March 18, 2008
INVENTOR(S) : Hirokazu Komuro It is certified that error appears in the above-identified patent and that said Letters Patent is hereby corrected as shown below:

COLUMN 13:

Line 15, "liquid" (second occurrence) should read --said liquid--.

COLUMN 14:

Line 8, "including" should read --includes--.

Signed and Sealed this

Ninth Day of September, 2008

Jon W. Dudas

JON W. DUDAS
*Director of the United States Patent and Trademark Office*